(12) United States Patent
Vera Villarroel et al.

(10) Patent No.: US 10,831,081 B2
(45) Date of Patent: Nov. 10, 2020

(54) OPTICAL WAVEGUIDE MODULATOR

(71) Applicant: Elenion Technologies, LLC, New York, NY (US)

(72) Inventors: Ariel Leonardo Vera Villarroel, Union City, NJ (US); Alexander Rylyakov, Staten Island, NY (US); Yangjin Ma, Brooklyn, NY (US)

(73) Assignee: Elenion Technologies, LLC, New York, NY (US)

(*) Notice: Subject to any disclaimer, the term of this patent is extended or adjusted under 35 U.S.C. 154(b) by 0 days.

(21) Appl. No.: 16/585,362

(22) Filed: Sep. 27, 2019

(65) Prior Publication Data

US 2020/0026147 A1 Jan. 23, 2020

Related U.S. Application Data

(63) Continuation of application No. 15/961,254, filed on Apr. 24, 2018, now Pat. No. 10,466,567.

(51) Int. Cl.
*G02F 1/225* (2006.01)
*G02F 1/21* (2006.01)

(52) U.S. Cl.
CPC .......... *G02F 1/2257* (2013.01); *G02F 1/2255* (2013.01); *G02F 2001/212* (2013.01)

(58) Field of Classification Search
CPC ........ G02F 1/025; G02F 1/0121; G02F 1/225; G02F 1/2255; G02F 1/2257; G02F 2001/0154; G02F 2001/212; G02F 2201/126
USPC ....................................................... 385/1–3
See application file for complete search history.

(56) References Cited

U.S. PATENT DOCUMENTS 9,841,618 B1 * 12/2017 Poulin ................... G02F 1/2255

* cited by examiner

*Primary Examiner* — Michael P Mooney
(74) *Attorney, Agent, or Firm* — Stratford Managers Corporation

(57) ABSTRACT

A dual-differential optical modulator includes two optical waveguide arms, each including one or more phase modulating p/n junctions. The p/n junctions in each waveguide arm are electrically coupled between a same pair of single-ended transmission lines so as to be differentially push-pull modulated when the transmission line pair is connected to a differential driver. Either cathode or anode electrodes of the p/n junctions are AC coupled to the transmission lines and DC biased independently on the transmission line signals.

19 Claims, 16 Drawing Sheets

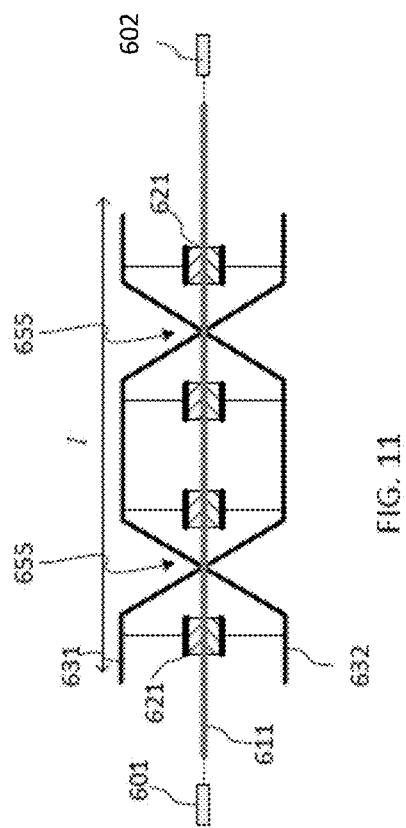

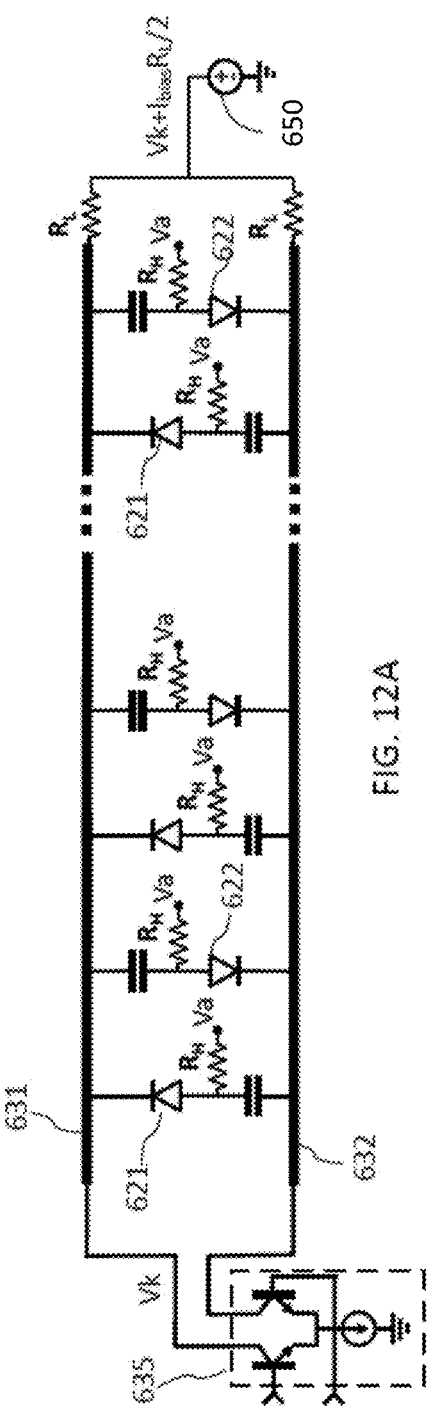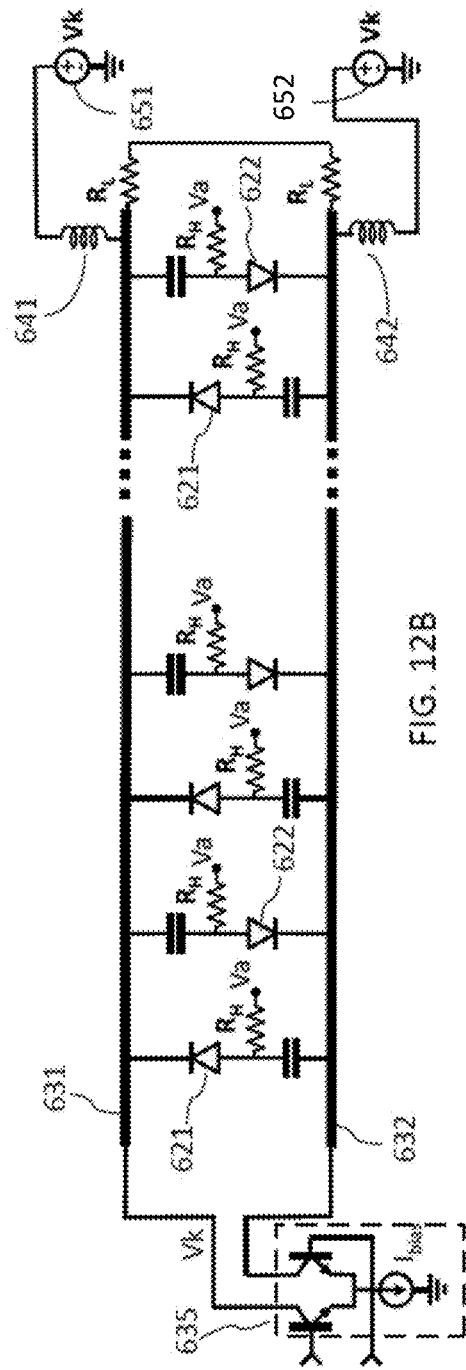
FIG. 12A
FIG. 12B

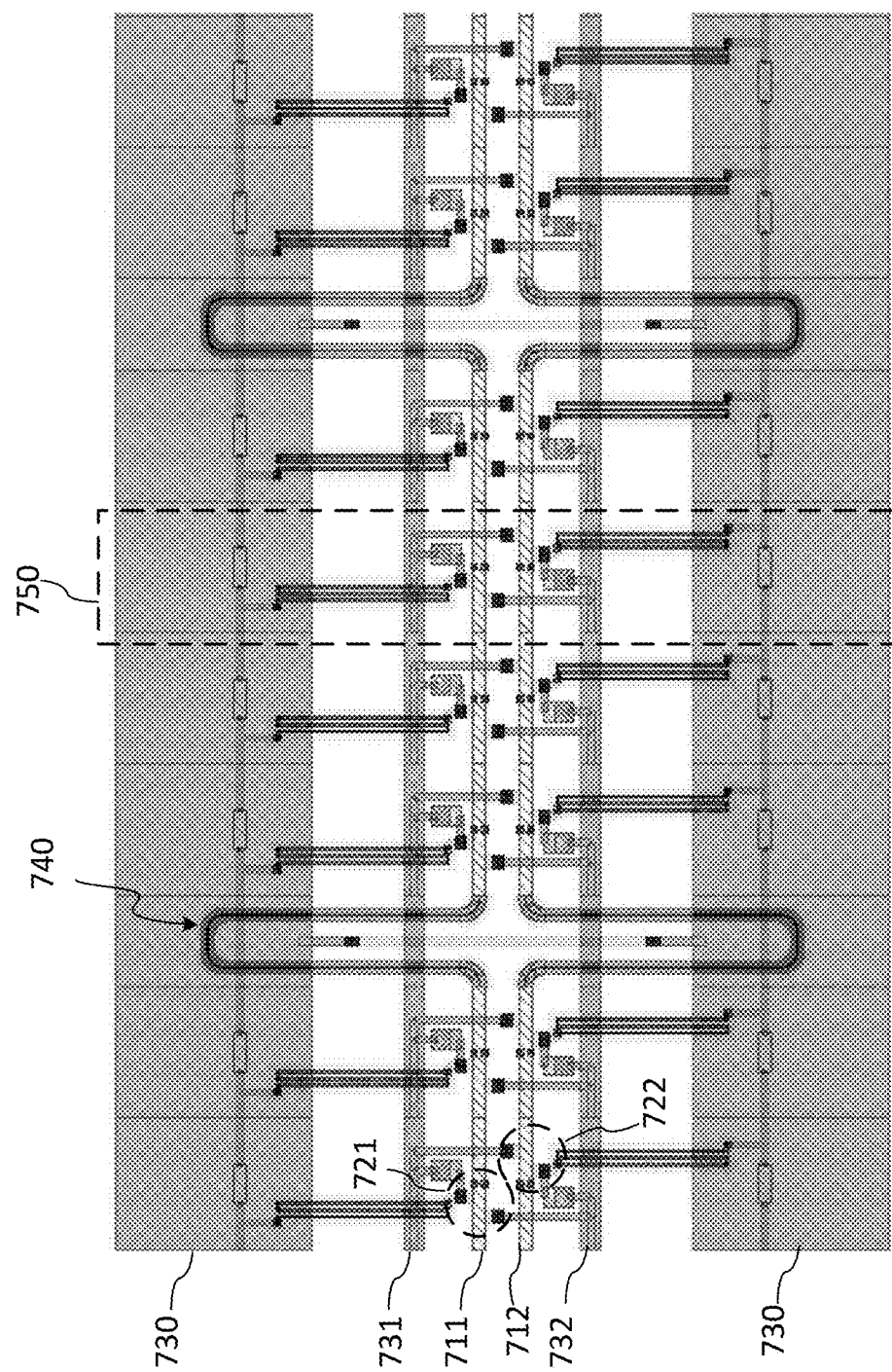

OPTICAL WAVEGUIDE MODULATOR

TECHNICAL FIELD

The present invention generally relates to optical modulators, and more particularly relates to a broad-band Mach-Zehnder optical waveguide modulator configured for dual-differential driving using a single differential transmission line.

BACKGROUND

Broad-band optical communications typically require high-speed electro-optical modulators (EOM) to modulate light at a desired data rate. One common type of a broad-band EOM is a Mach-Zehnder modulator (MZM) that uses a waveguide Mach-Zehnder (MZ) interferometric structure with RF-driven optical phase modulators in each arm. The waveguide arms of the MZM are typically formed in an electro-optic material, for example a suitable semiconductor or electro-optic dielectric material such as $LiNbO_3$, where optical properties of the waveguide may be controlled by applying a voltage to it. Such a waveguide modulator may be implemented in an opto-electronic chip as a photonic integrated circuit (PIC). A silicon photonics (SiP) platform based on Silicon on Insulator (SOI) technology may be particularly attractive for implementing broad-band modulators as it enables a natural integration with CMOS-based high-speed electronic drivers.

One common technique to high-speed modulation of propagating light, in particular at modulation rates on the order of 10-20 Gigabit per second (Gb/s) and higher, is the travelling wave approach, when the modulating electrical RF signals are applied to properly terminated electrical transmission lines that are electro-optically coupled and velocity-matched to the optical waveguides of the EOM. FIG. 1A schematically illustrates an example broad-band EOM in the form of an MZM 15 with two optical waveguide arms 11, 12 coupled to two electrical differential transmission lines 30 of length L, each formed by an inner signal electrode 22 and an outer signal electrode 21, with corresponding ground electrodes (not shown) and a differential transmission line termination 25. In the SiP platform, the electrodes 21, 22 may be overlaying p/n junctions formed across the waveguide arms that may either inject carriers (forward bias) or deplete carriers (reverse bias) in the waveguide core to modulate the refractive index of the waveguide by means of the carrier plasma dispersion effect. One known approach is a dual-differential modulation, in which each differential transmission line (TL) 30 is driven with a differential RF signal, so that in each differential TL 30 the inner electrode 22 and outer electrode 21 are driven with complementary single-ended RF signals, and the p/n junctions 31 in the waveguide arms 11, 12 are modulated in counter-phase; this effectively doubles the phase modulation amplitude at the output optical combiner of the MZM for a given peak-to-peak (PP) drive voltage $V_{PP}$ applied to each electrode, as compared to more traditional implementations in which the inner electrodes 22 are grounded. The TL pairs 30 are configured so that the differential RF signals propagate along them at the same velocity as the light that is travelling in the waveguide arms 11, 12. In one common implementation, the PN junctions 31 formed along the length of the TL pairs 30 are reverse-biased, and may be referred to as depletion-mode high-speed phase modulators (HSPMs). However the dual differential modulator of the type illustrated in FIG. 1A may require two differential drivers, or a single differential driver of a double output power, to drive the two electrode pairs 30, which complicates the design. Additionally, further lessening the MZM driver power requirements is desirable in many applications.

Accordingly, it may be understood that there may be significant problems and shortcomings associated with current solutions and technologies for providing high-bandwidth optical waveguide modulators.

SUMMARY

The present disclosure relates to an optical waveguide modulator comprising two waveguide arms and two single-ended transmission lines, wherein each of the waveguide arms is electrically coupled to each of the two single-ended transmission lines so as to be differentially modulated when complementary modulation signals are transmitted by the two single-ended transmission lines.

An aspect of the present disclosure provides an optical waveguide modulator comprising: an input optical port for receiving input light; an output optical port for outputting modulated light; first and second waveguide arms extending optically in parallel between the input and output optical ports to guide the input light from the input optical port to the output optical port along two light paths; a plurality of p/n junctions comprising one or more first p/n junctions formed in the first waveguide arm one or more second p/n junctions formed in the second waveguide arm, each p/n junction comprising an anode electrode and a cathode electrode. The optical waveguide modulator further comprises a first transmission line (TL) and a second TL, each extending along the first and second waveguide arms, wherein the first TL is electrically coupled to the anode electrode of each of the one or more first p/n junctions and to the cathode electrode of each of the one or more second p/n junctions, and the second TL is electrically coupled to the cathode electrode of each of the one or more first p/n junctions and to the anode electrode of each of the one or more second p/n junctions.

According to an aspect of the present disclosure, each of the anode electrodes and/or each of the cathode electrodes of the first and second p/n junctions is AC-coupled to one of the first and second TLs.

According to an aspect of the present disclosure, the optical waveguide modulator may further include electrical circuitry for providing a DC bias voltage to at least one of the cathode and anode electrodes of each p/n junction.

According to an aspect of the present disclosure, the optical waveguide modulator may further include a differential driver configured to feed complementary electrical signals into the first and second transmission lines. In some implementations the differential driver may be DC coupled to the first and second TLs. In some implementations the differential driver may include an open-collector differential amplifier stage that is DC coupled to the first and second TLs.

In some implementations the electrical circuitry may include one or more resistors electrically connected to the cathode electrodes for DC biasing thereof.

In some implementations each of the anode electrodes may be AC-coupled to one of the first and second transmission lines, and each of the cathode electrodes is either DC-coupled or AC coupled to one of the first and second transmission lines.

In some implementations the electrical circuitry may include one or more coupling electrodes electrically connected to the cathode electrodes or the anode electrodes and capacitively coupled to one of the first and second transmission lines. In some implementations the one or more coupling electrodes may be disposed over or under the first or second transmission lines with an insulating layer therebetween. In some implementations the one or more coupling electrodes are disposed next to the first or second transmission lines coplanar therewith.

In some implementations the first and second transmission lines may cross each other at least once forming a TL crossing. In some implementations the one or more first p/n junctions comprises two first p/n junctions of opposite polarity disposed at opposite sides of the TL crossing, and the one or more second p/n junctions comprises two second p/n junctions of opposite polarity disposed at opposite sides of the TL crossing.

In some implementations one of the one or more coupling electrodes extends along the first TL for at least a portion of a length thereof, and at least one of the cathode electrodes or the anode electrodes is electrically connected to the one of the one or more coupling electrodes at a distal end thereof that is farther away from an input end of the first TL for receiving an electrical drive signal.

An aspect of the present disclosure provides an optical waveguide modulator comprising: an input optical port for receiving input light; an output optical port for outputting modulated light; first and second waveguide arms extending optically in parallel between the input and output optical ports to guide the input light from the input optical port to the output optical port along two light paths; a first phase modulator (PM) disposed in the first waveguide arm and comprising an anode electrode and a cathode electrode; a second PM disposed in the second waveguide arm and comprising an anode electrode and a cathode electrode, wherein each of the first and second PM is configured to modulate a phase of light propagating therein in response to a voltage applied between the anode and cathode electrodes thereof; a first transmission line (TL) extending along the first and second waveguide arms and electrically coupled to the anode electrode of the first PM and the cathode electrode of the second PM; and, a second TL extending along the first and second waveguide arms and electrically coupled to the cathode electrode of the first PM and to the anode electrode of the second PM.

In some implementations the first and second waveguide arms may comprise electro-optic material. In some implementations the first and second waveguide arms may comprise semiconductor material, and the first and second PMs may each comprise a p/n junction.

In some implementations at least the anode electrodes of the first and second PMs or at least the cathode electrodes of the first and second PMs are AC-coupled to the corresponding first or second TLs.

In some implementations the waveguide modulator may comprise a silicon photonics chip wherein the first and second waveguide arms and the first and second TLs are formed, and wherein the semiconductor material comprised silicon.

In some implementations the waveguide modulator may include first and second coupling electrodes disposed next to the first and second TLs respectively so as to be electrically AC coupled therewith, wherein either the anode electrodes or the cathode electrodes of the first and second PMs are electrically connected in DC to the first and second coupling electrodes respectively. In some implementations the first and second coupling electrodes may be disposed directly over or under the first and second TLs respectively.

An aspect of the present disclosure provides an optical waveguide modulator comprising: two optical ports, an optical waveguide connecting the two optical ports, two transmission lines (TLs) extending along a length of the optical waveguide, and, a plurality of phase modulators (PM) spread along the length of the optical waveguide, each PM electrically connected to the two TLs and configured to modulate a phase of light propagating in the optical waveguide in response to a difference in electrical signals propagating in the two TLs. The two TLs intersect at one or more locations to form one or more TL crossings wherein the TLs are magnetically coupled for increasing an effective inductance and an impedance thereof.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein:

FIG. 11 is a schematic diagram of a portion of a travelling wave optical modulator with two TLs routed to form one or more TL crossings;

FIG. 12A is a diagram illustrating bias circuitry of a DDM with an open collector driver and simultaneous biasing of HSPMs and the driver through TL termination resistors;

FIG. 12B is a diagram illustrating bias circuitry of a DDM with an open collector driver and simultaneous biasing of HSPMs and the driver using a bias-T;

FIG. 13 is a schematic plan view of an electrical layout of a portion of a DDM chip in one implementation thereof;

DETAILED DESCRIPTION

Figure 1A:
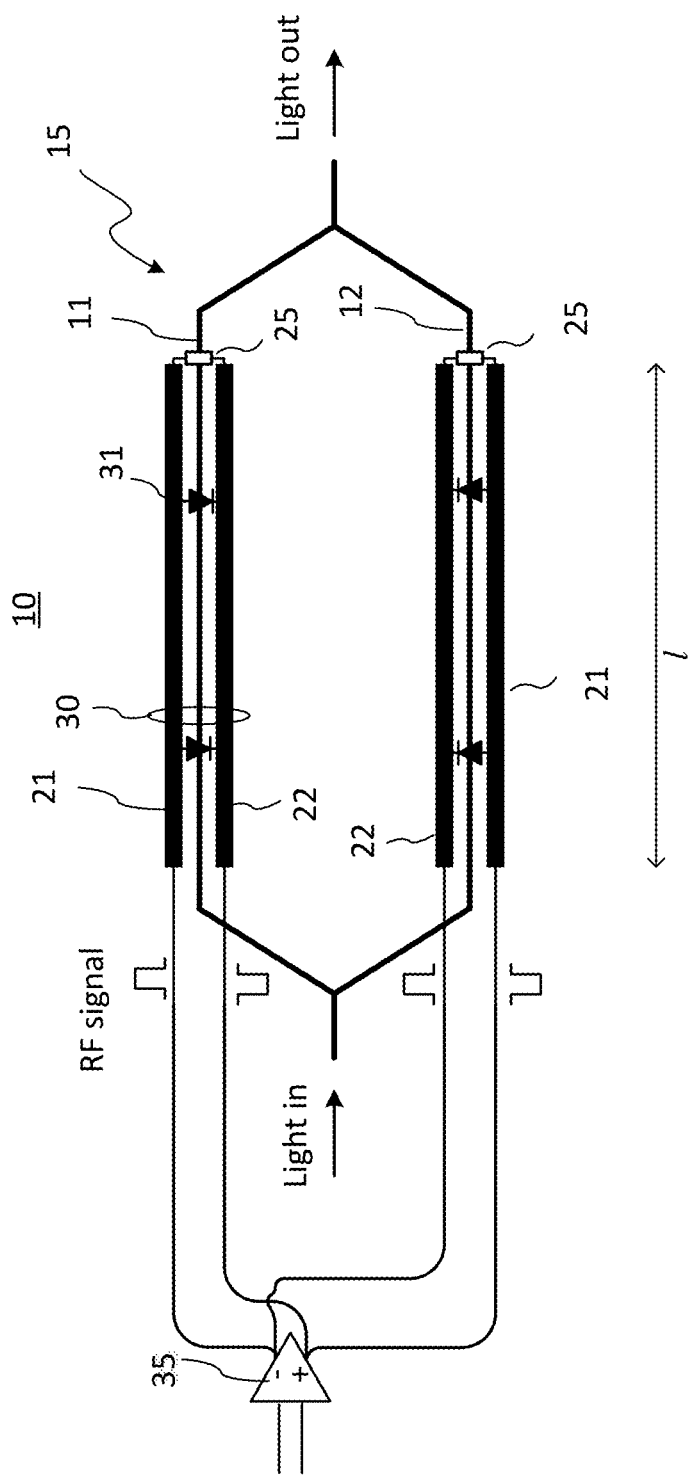
FIG. 1A is a schematic block diagram of a travelling-wave waveguide Mach-Zehnder modulator with a dual-differential modulation, in which each of the waveguides arms is differentially modulated using a separate pair of single-ended electrical transmission lines (TLs)

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

CMOS Complementary Metal-Oxide-Semiconductor
BiCMOS Bipolar CMOS
GaAs Gallium Arsenide
InP Indium Phosphide
LiNbO3 Lithium Niobate
PIC Photonic Integrated Circuits
SOI Silicon on Insulator
SiP Silicon Photonics
PSK Phase Shift Keying
BPSK Binary Phase Shift Keying
QAM Quadrature Amplitude Modulation
QPSK Quaternary Phase Shift Keying
RF Radio Frequency
DC Direct Current
AC Alternate Current
OSNR Optical Signal to Noise Ratio
MiM Metal-Insulator-Metal
RMS Root Mean Square Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. Notation $V\pi$ refers to a bias voltage of a Mach-Zehnder modulator (MZM) that corresponds to a change in a relative phase delay between arms of the MZM by $\pi$ radian (rad), or 180 degrees, which corresponds to a change from a minimum to a next maximum in the MZM transmission versus voltage. Radio frequency (RF) may refer to any frequency in the range from kilohertz (kHz) to hundreds of gigahertz (GHz). The term p/n junction encompasses p/i/n junctions having a region of substantially intrinsic conductivity located between the p-doped and n-doped regions. The term "differential signal" refers to a signal composed of two single-ended signals having complementary AC components. The term "inverted differential signal" refers to a differential signal having AC components of its constituent single-ended signals inverted relative to those of a reference differential signal, or a differential signal having high-low and low-high transitions switched. The term "transmission line" (TL) may be used herein to refer to a signal electrode of a transmission line, with the understanding that at least one ground electrode may also present. The term "single-ended transmission line", or "single-ended TL", refers to a TL that includes a single signal electrode along which a single-ended RF signal may propagate. The term "differential transmission line", or "differential TL", refers to a TL that includes a pair of signal electrodes along which two complementary single-ended RF signals may propagate. The term "electrically connected" is used herein to mean a DC electrical connection with a conducting pathway, unless explicitly stated otherwise. The term "AC coupled" is used herein to mean an electromagnetic, such as capacitive and/or inductive, coupling between two or more elements in the absence of a DC electrical connection between the elements, unless explicitly stated otherwise. The term "electrically coupled" encompasses both DC and AC electrical coupling.

The present disclosure relates to an electro-optic modulator (EOM) and a related method in which two optical waveguides, also referred to herein as the waveguide arms, are used to guide input light from an input optical port to an output optical port along two or more optical paths; such EOMs may also be referred to herein as an optical waveguide modulator or as an optical modulator. One aspect of the present disclosure relates to a dual-differential EOM, which is also referred to herein as the dual-differential modulator (DDM), wherein each of the two waveguide arms is differentially modulated, i.e. modulated by a differential RF signal, and wherein the modulating differential signal is provided to each of the waveguide arms from the same two transmission lines (TLs); thus both waveguide arms may be modulated using the same differential amplifier that drives a single TL pair, which reduces the power requirements on the differential driver up to a factor of two compared to the DDM 10 of FIG. 1A in which each waveguide arm is driven by a dedicated TL pair.

In order to better understand advantages of this approach, it may be instructive to first consider the DDM 10 illustrated in FIG. 1A, in which two TL pairs 30 are used to drive two sets of depletion-mode HSPMs 31, each set disposed to modulate one of the waveguide arms 11 and 12. Typically, a MZM 15 requires a relatively large modulation voltage swing (>5V), which is provided by the modulator driver 35. Broad-band modulation requires the use of high-speed transistors in the modulator driver 35. However, transistors designed for high-speed operation have a relatively low breakdown voltages, which limits the driver maximum output voltage swing. Reliability and lifetime of the driver's transistors are compromised when driving voltages exceed their breakdown limits. The trade-off between speed and maximum output voltage swing limits the performance of the driver implemented in a given technology.

Another issue of practical importance that is related to the driver's maximum voltage swing is the power consumption, which reduction is typically desired. The part of the RF power $P_{diss}$ dissipated in the MZM 15 that depends on the voltage swing at the driver's output is inversely proportional to the characteristic impedance $Z_{MOD}$ of the modulator, $P_{diss} \propto V_{RMS\_SWING}^2/Z_{MOD}$, where $V_{RMS\_SWING}$ is the RMS value of the peak-to-peak voltage swing $V_{PP}$ at the output of the driver 35, for example for a sinusoidal signal $V_{RMS\_SWING}=V_{PP}/(2\sqrt{2})$. Thus, increasing the modulator impedance $Z_{MOD}$ allows to reduce its power consumption, and ultimately the cost of manufacturing and operating the optical transmitter. Furthermore, replacing two TL pairs with one allows to reduce the modulator foot print and thus the chip area of the modulator. Furthermore the increase in modulator impedance may be used in a tradeoff with other design parameters of the modulator, for example by "trading" the increase in the impedance for a higher bandwidth.

For the DDM 10, the modulator impedance $Z_{MOD}$ is the load impedance $Z_{DDM}$ of the differential driver 35, which is defined by the impedance of the two TL pairs 30 connected in parallel, i.e. $Z_{DDM}=Z/2$. Here $Z=\mathrm{sqrt}(L_{TL}/(C_{TL}+C_{HSPM}))$ is the impedance of each TL pair 30, with $L_{TL}$ and $C_{TL}$ denoting the inductance and capacitance of one TL pair 30, respectively, and $C_{HSPM}$ is the total capacitance of the HSPMs in one waveguide arm.

Figure 1B:
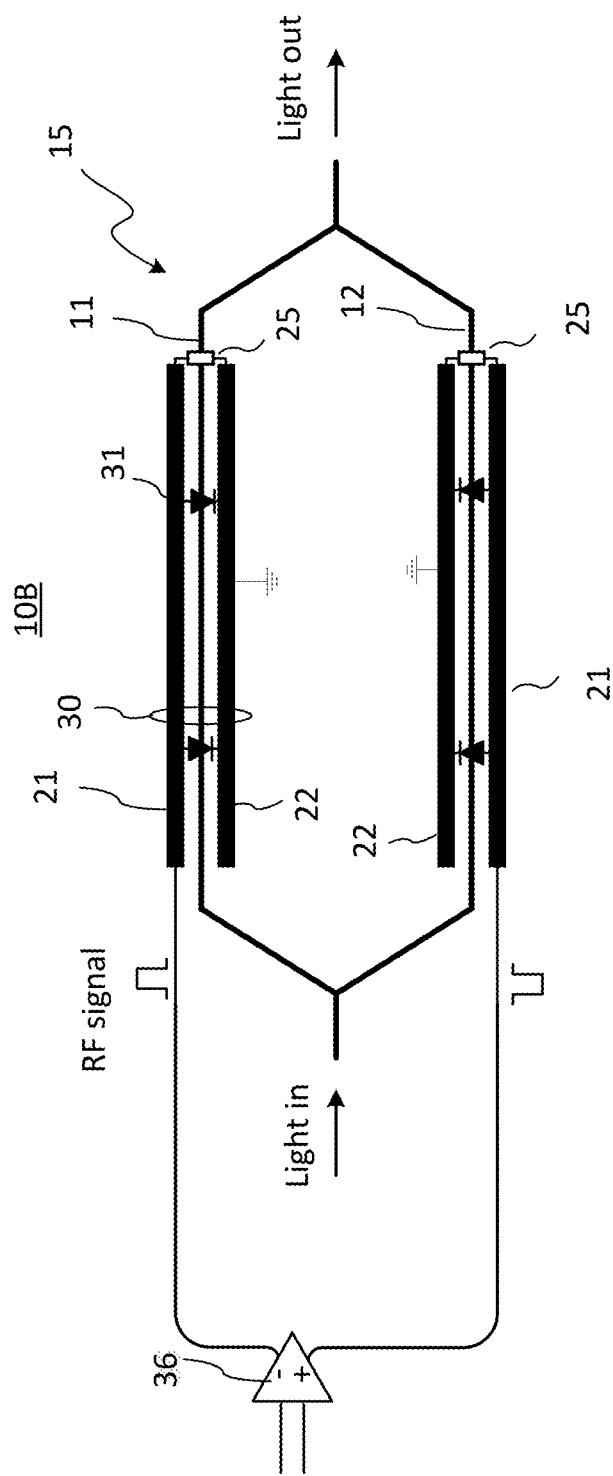
FIG. 1B is a schematic block diagram of a travelling-wave waveguide Mach-Zehnder modulator with a single-differential modulation, in which each of the waveguides arms is modulated using a single-ended TL.

The DDM 10 of the type illustrated in FIG. 1A, in which two TL pairs 30 are driven in parallel by a single differential driver 35, requires half of a voltage swing of a single-differential modulator (SDM) 10B of FIG. 1B, in which e.g. inner electrodes 22 of each TL pair 30 are grounded and the outer electrodes 21 are differentially driven, as illustrated in FIG. 1B. However, since in the embodiment of FIG. 1A the differential driver 35 feeds into two TL pairs 30 in parallel, it has to provide twice the current of an SDM driver 36 of FIG. 1B. Therefore drivers of equivalent DDM and SDM may consume about the same amount of power, and the reduced voltage swing of the DDM 10 of FIG. 1A, as compared to an equivalent SDM 10B of FIG. 1B, is obtained at the cost of increased complexity and chip area.

Figure 2:
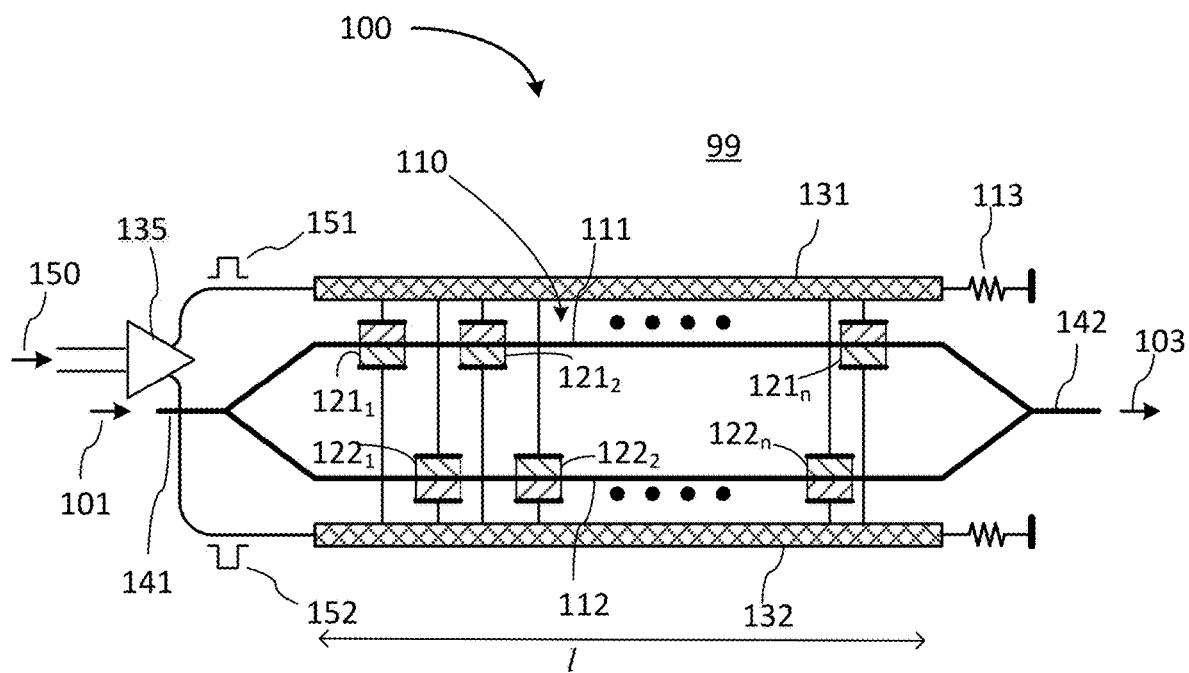
FIG. 2 is a schematic diagram of an optical dual differential modulator (DDM) in which HSPMs in both waveguides arms are differentially modulated using a same pair of single-ended electrical transmission lines (TLs)

Turning now to FIG. 2, there is schematically illustrated an improved DDM 100 in accordance with an example embodiment of the present disclosure, in which power and/or chip area requirements are advantageously relaxed. In the illustrated embodiment, HSPMs disposed in each of two waveguide arms 111, 112 of a Mach-Zehnder interferometer (MZI) 110 are differentially driven by complementary RF signals 151, 152 from the same two single-ended TLs 131 and 132 that extend along the waveguide arms 111, 112, respectively, and are fed at their input ends from a differential RF driver 135. Since each of the waveguide arms 111, 112 of the MZI 110 is differentially modulated, the peak-to-peak voltage swing $V_{PP}$ that driver 135 needs to generate is one half of that of an equivalent SDM. Furthermore since the RF driver 135 has to drive only the single pair of TLs 131, 132, its load impedance may be substantially equal to the load impedance of an equivalent SDM and is twice the load impedance of the DDM 10 of FIG. 1A, thereby advantageously reducing the power requirements on the driver 135.

Continuing to refer to FIG. 2, in the illustrated embodiment the DDM 100 includes an input optical port 141 for receiving input light 101, an output optical port 142 for outputting modulated light 103, and the first and second waveguide arms 111, 112 extending optically in parallel between the input and output optical ports 141, 142 to guide the input light 101 from the input optical port 141 to the output optical port 142 along two light paths. The first waveguide arm 111 includes one or more first HSPMs $121_1$, $121_2$, . . . $121_n$ that may be referred generally as the first HSPMs 121, while the second waveguide arm 112 includes one or more second HSPMs $122_1$, $122_2$, . . . $122_n$ that may be referred generally as the second HSPMs 122. The number n of the HSPMs in each waveguide arm 111, 112 may vary from 1 to 20 or more, and may be the same for each waveguide arm 111 and 112, although it is not a requirement. In example embodiments described hereinbelow each of the first and second HSPMs 121, 122 has two electrodes 121a, 121k and 122a and 122k, respectively, which are disposed at opposite sides of the respective waveguide arm 111 and 112, and which may be referred to herein as the anode electrode and the cathode electrode, or simply the anode and the cathode. The HSPMs 121, 122 are configured to vary the refractive index in at least a portion of the respective waveguide arm 111 and 112 in dependence to a sign and magnitude of a voltage applied between the anode and the cathodes electrodes, e.g. 121a and 121k, thereby modulating the optical phase of light 101 propagating therethrough. In some embodiments the HSPMs 121, 122 may be configured so that their phase modulation efficiency depends on the location along the waveguide arms 111, 112. Although the first and second HSPMs 121, 122 are shown in FIG. 2 with a relative shift therebetween along the length of the DDM 100 for convenience of illustration, in a typical embodiment they may be pair-wise aligned so as to be at a same optical distance from the input optical port 141.

Figure 3:
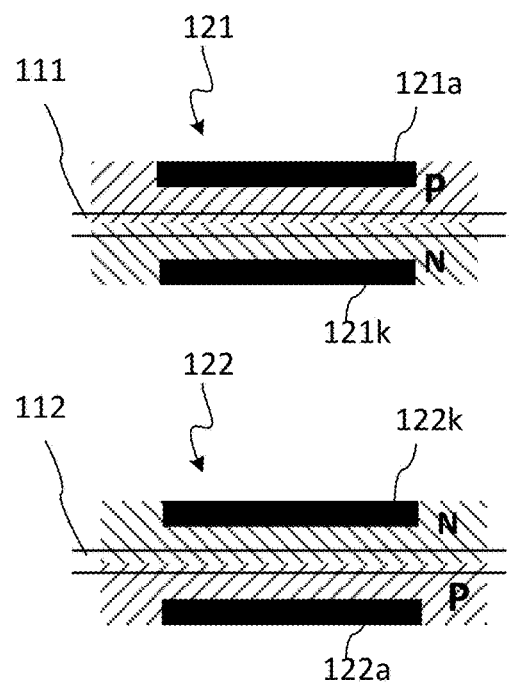
FIG. 3 is a schematic expanded view of a portion of an embodiment of the modulator of FIG. 2 with a modulating p/n junction in each waveguide arm.

Referring also to FIG. 3 that schematically illustrates a portion of the DDM 100 including one HSPM 121 and one HSPM 122, in example embodiments described hereinbelow each of the HSPMs 121 and 122 may be in the form of a p/n junction with the anode electrode 121a or 122a respectively, and the cathode electrode 121k or 122k respectively. In such embodiments the first HSPMs 121 may also be referred to as the first p/n junctions 121, and the second HSPMs 122 may also be referred to as the second p/n junctions 122.

In one embodiment one of the TLs 131 or 132, for example the first TL 131 may be electrically coupled to the anode electrode 121a of each of the one or more first HSPMs 121 and to the cathode electrode 122k of each of the one or more second HSPMs 122, and the other of the two TLs, for example the second TL 132 may be electrically coupled to the cathode electrode 121k of each of the one or more first HSPMs 121 and to the anode electrode 121a of each of the one or more second HSPMs 122. With this configuration, when the first and second TLs 131 and 132 are differentially driven with complementary single-ended signals 151, 152, the first and second HSPMs 121, 122 are modulated in counter-phase, thereby affecting a push-pull modulation of light in the first and second waveguide arms 111, 112.

The first and second TLs 131 and 132 are represented in FIG. 2 by their respective signal electrodes but may also include one or more ground electrodes that are not shown in the figure to avoid clutter. They may be generally in the form of any suitable TLs, including but not limited to microstrip TL, coplanar (CPW) TL, conductor backed CPW, and stripline TL. The first and second TLs 131 and 132 are differentially driven from one end by the differential driver 135 and are terminated at the other ends with a suitable line termination 113, which may be in the form or include a resistor, having a characteristic impedance $Z_{DDM2}/2$ so as to suppress the reflection of electrical signals at the end of the TL 131 and 132. Here $Z_{DDM2}$ denotes the load impedance seen by the differential driver 135:

$$Z_{DDM2} = \sqrt{\frac{L_{DTL}}{C_{HSPM} + C_{DTL}}}$$

where $L_{DTL}$ and $C_{DTL}$ are the inductance and capacitance of the differential TL formed by the first and second single-ended TLs 131, 132, and $C_{HSPM}$ is the total capacitance of all HSPMs 121 and 122 in both waveguide arms 111, 112. The load impedance $Z_{DDM2}$ seen by driver 135 is greater than the load impedance seen by driver 35 of the DDM 10 of FIG. 1, the DDM 100 requires less current, and therefore lower power, to achieve the same modulation efficiency of the input light 101.

In one embodiment the waveguide arms 111 and 112 of the MZI 110 and the signal electrodes 131 and 132 may be formed in a semiconductor chip 99, such as for example a silicon photonics (SiP) chip, GaAs based chip, or InP based chip, or any other chip of a suitable semiconductor material. In one embodiment the MZI 110 and TLs 131, 132 are formed in or upon a SOI chip, with the waveguides, e.g. 111 and 112, forming the MZI 110 having their cores defined in a silicon layer of the SOI chip. In one embodiment the HSPMs 121 and 122 may be depletion-type HSPMs in the form of p/n junctions, for example formed within the Si waveguide cores. In some embodiments the p/n junctions of the HSPMs 121, 122 may be in the form of PIN junctions, with an intrinsic (I) region in the middle of the waveguide core sandwiched between a P-doped and an N-doped regions. It will be appreciated that a waveguide MZI with p/n junction based HSPMs in its arms may also be formed in semiconductor materials other than Si, and corresponding embodiments of the DDM 100 are within the scope of the present disclosure.

When embodied as p/n junctions, the HSPMs 121, 122 modulate the refractive index in the waveguide arms 111, 112 by varying the concentration of free charge carriers therein in response to an applied voltage, thereby modulating an optical phase of the light 101 propagating in the waveguide arm 111 and 112. For optimal operation the p/n junctions of the HSPMs 121, 122 may be suitably biased, for example reversed biased so as to operate in the depletion mode in which the number of free carriers in the waveguide is relatively small. When reverse biased, the p/n junctions 121, 122 may be referred to as carrier depletion based HSPMs. Accordingly, in such embodiments the DDM 100 may include electrical circuitry for providing a DC bias voltage to at least one of the cathode and anode electrodes 121$k$, 122$k$ and 122$k$, 122$a$ of each p/n junction of the HSPMs 121 and 122. In some embodiments it may be configured to provide different DC voltages to the anodes and the cathodes of the p/n junctions of the HSPMs 121, 122 independently on the RF data signals 151, 152 propagating along the TLs 131, 132. This circuitry may include bias resistors, electrical leads, and circuitry providing AC coupling pathways between the cathodes 121$k$, 122$k$ of the p/n junctions of the HSPMs 121 and 122 and the TLs 131, 132 and/or AC coupling pathways between the anodes 121$a$, 122$a$ of the p/n junctions of the HSPMs 121, 122 and the TLs 131, 132.

Figures 4A, 4B:
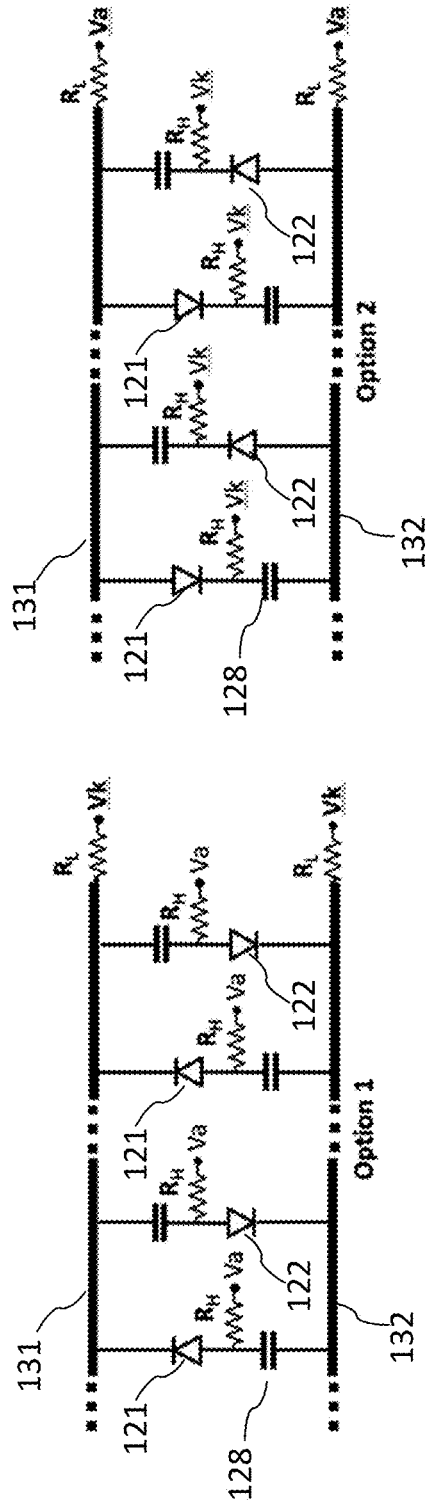
FIG. 4A is a simplified electrical circuit diagram of an embodiment of the DDM of FIG. 2 with AC-coupled anodes of the HSPMs.
FIG. 4B is a simplified electrical circuit diagram of an embodiment of the DDM of FIG. 2 with AC-coupled cathodes of the HSPMs.

FIGS. 4A and 4B illustrate simplified electrical circuit diagrams of a section of the DDM 100 encompassing two HSPMs 121 and 122 in each waveguide arm 111 and 112 (not shown) for two example embodiments. Turning first to FIG. 4A, in this embodiment the cathodes of the p/n junctions of the HSPMs 121 and 122, which are shown as diodes, are DC coupled to the signal electrodes of the TLs 131 and 132, respectively, while the anodes of all the p/n junctions of the HSPMs 121, 122 are AC-coupled to the corresponding TLs, as indicated by capacitors 128 representing the effective capacitance of the corresponding AC coupling structures. The anode bias voltage Va is supplied to the anodes of the p/n junctions 121, 122 via dedicated bias resistors $R_H$, while the cathode bias voltage Vk is supplied to the cathodes of the p/n junctions via a bias resistors $R_L$ and the signal electrodes of the TLs 131 and 132. In the embodiment illustrated in FIG. 4B the polarity of each of the p/n junctions of the HSPMs 121, 122 is flipped, so that the anodes of the p/n junctions of the HSPMs 121 and 122 are DC coupled to the signal electrodes of the TLs 131 and 132, respectively, to receive the anode bias voltage Va that is provided to the TLs 131 and 132 via the bias resistor $R_L$. The cathodes of all the p/n junctions of the HSPMs 121, 122 in this embodiment are AC-coupled to the signal electrodes of the corresponding TLs 131 and 132, and receive the cathode bias voltage Vk via the dedicated bias resistors $R_H$. It will be appreciated that in other embodiment both the cathode electrodes and the anode electrodes of each, or at least some, of the p/n junctions of the HSPMs 121, 122 may be AC coupled to the signal electrodes of the TLs 131, 132. Resistors $R_L$ may be selected so as to provide the desired TL termination 113 as illustrated in FIG. 2. Resistors $R_H$ defines the low-cutoff frequency $f_c = 1/(2\pi R_H C_{AC})$. Each of the resistors $R_H$ and $R_L$ may be for example in the range of tens of ohms and kiloohms to megaohms. The effective capacitance $C_{AC}$ of the TL-anode/cathode AC coupling, represented by the capacitors 128, may be for example in the range of tens of femtofarads to units of picofarads.

Figure 5A:
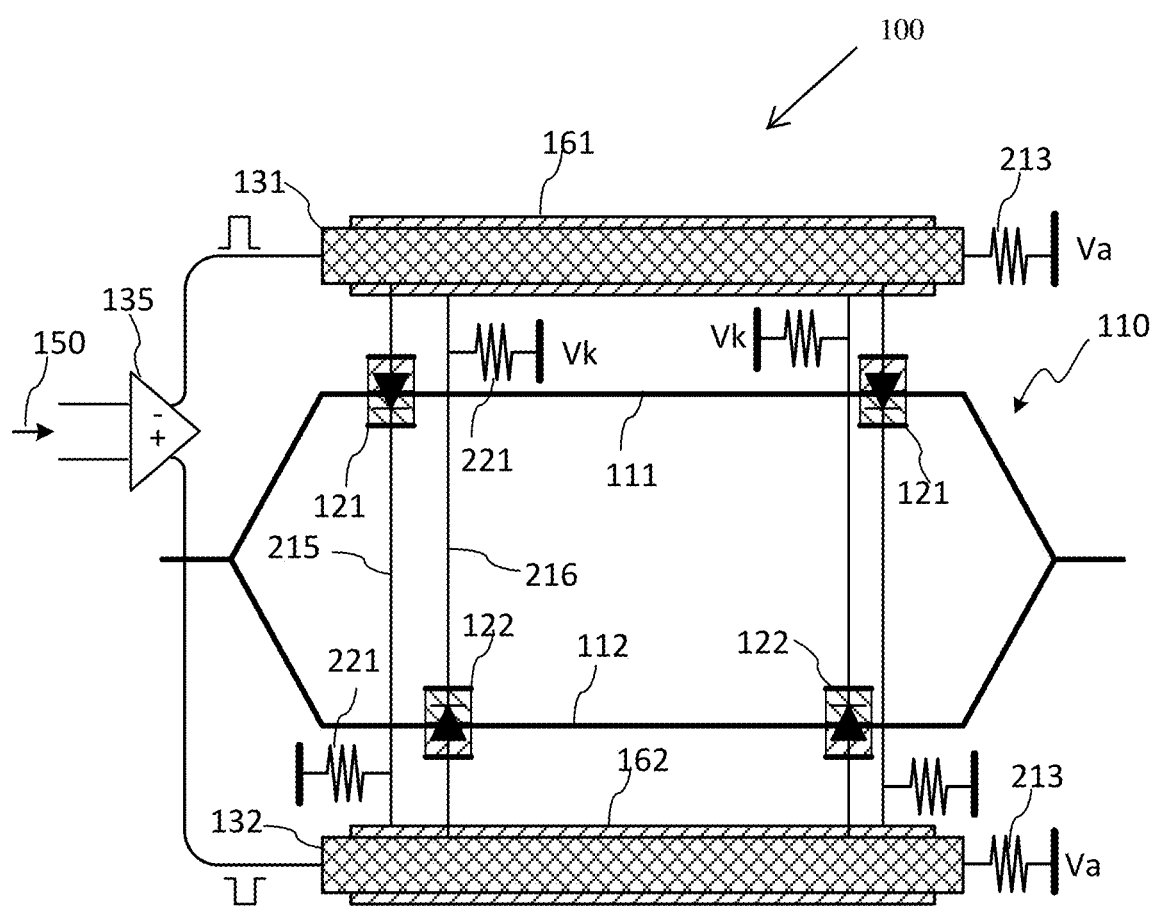
FIG. 5A is a schematic diagram of an embodiment of the DDM of FIG. 2 with the cathodes of the HSPMs in each waveguide arm AC coupled to one of the TLs by means of a common coupling electrode, and are separately DC biased.

Turning now to FIG. 5A, there is schematically illustrated a plan view of an example embodiment of DDM 100 in which the cathodes of p/n junctions 121, 122 are AC coupled to the TLs 131, and 132, respectively, by means of coupling electrodes 161 and 162 that are disposed next to the corresponding TLs 131, 132 but without a direct electrical contact therebetween. The cathodes of the p/n junctions of the HSPM 121 are electrically connected, for example by suitable low-resistance conducting pathways 215, to the coupling electrode 162 that is AC coupled to TL 132, while cathodes of the p/n junctions of the HSPM 122 are electrically connected, for example by suitable low-resistance conducting pathways 216, to the coupling electrode 161 which is AC coupled to TL 131. In the illustrated embodiment the coupling electrodes 161 and 162 are disposed directly under TLs 131 and 132, respectively, although in other embodiments they may be disposed over or next to the respective TLs, with a thin insulating layer or material therebetween, so as to provide the desired AC coupling to the signal electrode of the respective TL while insulating the cathodes therefrom in DC. In the illustrated embodiment the anodes of the HSPMs 121, 122 are DC coupled to the respective TLs. Cathode biasing resistors 221 for individually DC biasing the cathodes of each of the p/n junctions of the HSPMs 121, 122 may be implemented in the same chip as the MZI 110 and the TLs 131, 132, or they may be a part of an external biasing circuit. It will be appreciated that the polarities of the HSPMs 121, 122 may be flipped, so that the anodes are AC coupled and the cathodes are DC coupled as illustrated in FIG. 4B.

Figure 5B:
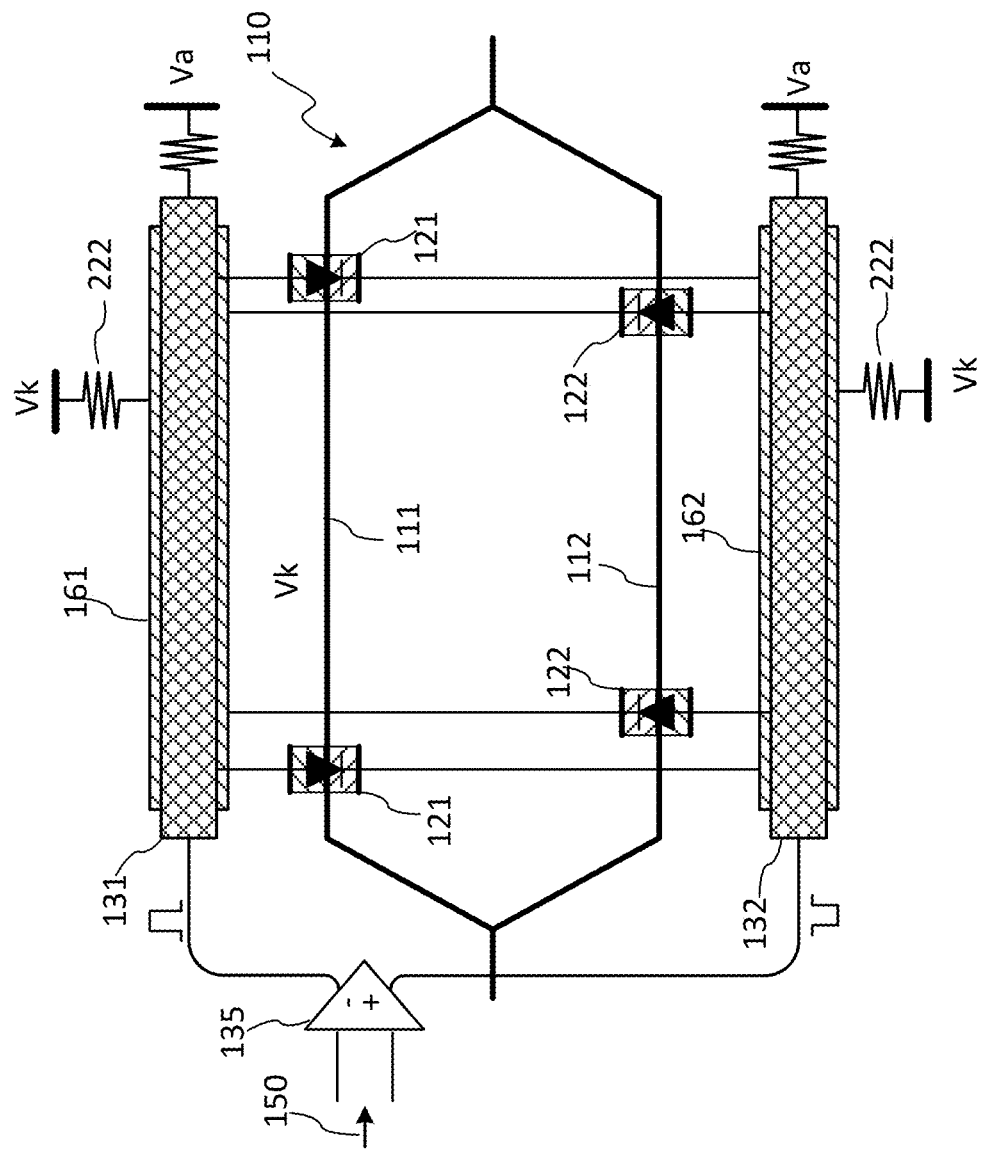
FIG. 5B is a schematic diagram of a variation of the DDM of FIG. 5A including a bias resistor for providing a DC bias voltage to the coupling electrode for DC biasing the cathodes of the HSPMs connected thereto.
Figure 5C:
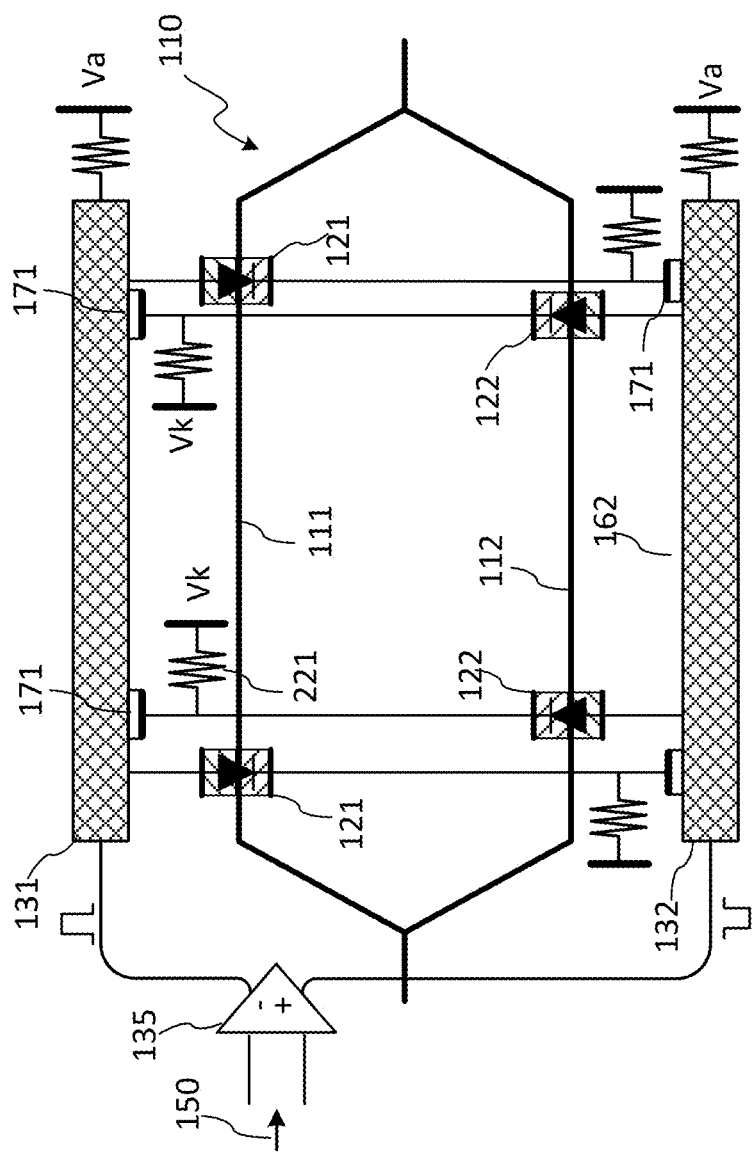
FIG. 5C is a schematic diagram of an embodiment of the DDM of FIG. 5A in which the cathodes of the HSPMs in each waveguide arm are separately AC coupled to one of the TLs and DC biased.

In the embodiment of FIG. 5A each of the HSPMs' 121 cathodes is AC coupled to TL 132 through a same coupling electrode 162 and DC biased from a dedicated resistor 221, while each of the HSPMs' 122 cathodes is AC coupled to TL 131 through a same coupling electrode 161 and DC biased from its own dedicated resistor 221. In other embodiments the DC cathode bias voltage Vk may be applied through each of the coupling electrodes 161, 162, as illustrated in FIG. 5B. In yet another embodiment illustrated in FIG. 5C, the cathodes or anodes of each of the HSPMs 121 and 122 may each use a separate AC coupling arrangement 171, e.g. in the form of a separate coupling electrode, for coupling to the respective TL. It will be appreciated that the polarity of the HSPMs 121, 122 in FIGS. 5A-5C may be flipped so that it is the HSPM anodes that are AC coupled to the respective TLs, or the structure modified so that both the cathodes and the anodes of the HSPMs 121, 122 are AC coupled to the respective TLs.

Figure 6:
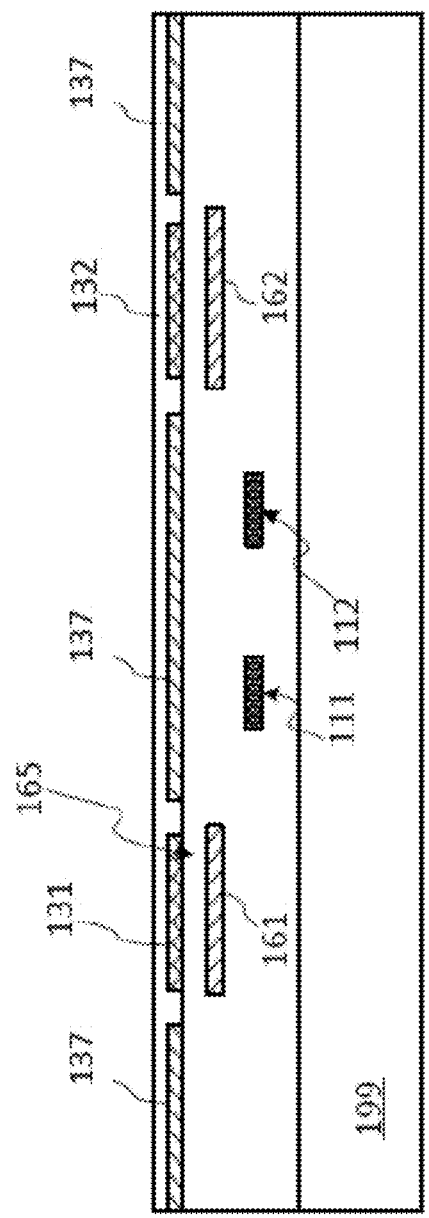
FIG. 6 is a schematic cross-sectional view of a DDM chip with AC coupling electrodes with the cross-section taken in a lateral plane that is normal to the direction of signal propagation in the device.

Referring to FIG. 6, it schematically illustrates a lateral cross-section of a chip implementing the DDM 100 in an example embodiment thereof. The cross-section is taken across the device structure perpendicularly to the direction of light propagation in the DDM. It will be appreciated that the view illustrated in FIG. 6 is by way of illustration only, and the chip may include also other layers and/or elements that are not shown in the figure. In the illustrated example embodiment the waveguide arms 111 and 112 are shown disposed over a support substrate or wafer 199 in an insulating cladding layer or material 165. Coupling electrodes 161, 162 are disposed directly under the signal electrodes of TLs 131, 132, so as to provide the AC coupling thereto. The thickness of the intermediate insulating layer 165 between the coupling electrodes 161, 162 and the corresponding signal electrodes of TLs 131 and 132 may be for example, in the range of 0.1 μm to 1 μm, or as needed to obtain the desired AC coupling and DC insulation between the respective electrode pairs 131-161 and 132-162. Ground electrodes 137 may be disposed coplanar with the signal electrodes of the TLs 131, 132 as illustrated by way of example, but may also be provided in a different plane, for example on the back side of substrate 199. In one embodiment substrate or wafer 199 may be for example a silicon substrate, the insulating material 165 being for example silicon dioxide, with silicon waveguides 111, 112, and metal electrodes 131, 132, 161, 162, 137.

Figure 7A:
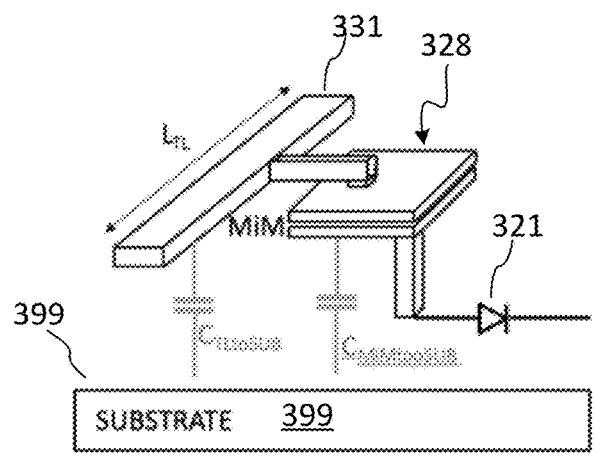
FIG. 7A is a schematic diagram illustrating a 3D view of an AC coupling between an HSPM and a TL using a separate MiM structure formed next to the TL.
Figure 7B:
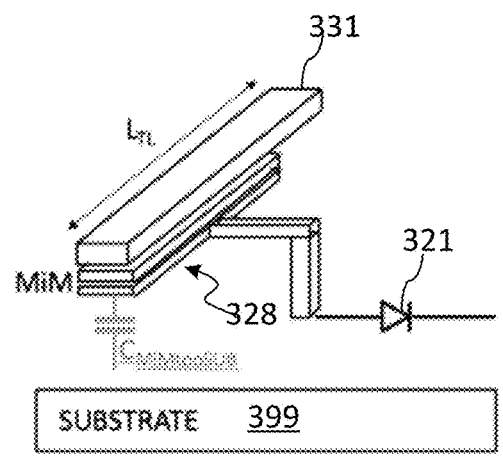
FIG. 7B is a schematic diagram illustrating a 3D view of an AC coupling between an HSPM and a TL using a separate MiM structure formed directly below the TL.
Figure 7C:
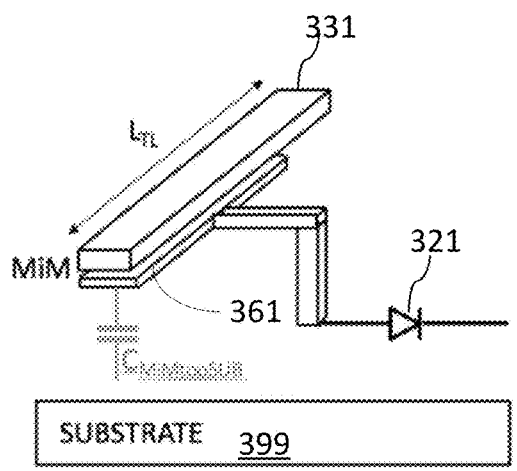
FIG. 7C is a schematic diagram illustrating a 3D view of an AC coupling between an HSPM and a TL using a coupling electrode disposed under the TL and forming a MiM structure therewith.

Turning now to FIGS. 7A-7D, the AC coupling between the HSPM cathodes or anodes and the corresponding TLs may be arranged in a variety of ways, for example using metal-insulator-metal (MiM) structures such as those schematically illustrated in the figures. Referring first to FIG. 7A, a TL signal electrode 331, which may for example represent the signal electrode of either TL 131 or 132 of DDM 100, is electrically connected, for example using a metallic conductor, to one of two metal electrodes of a MiM structure 328, with the anode of an HSPM 321, schematically illustrated by a diode symbol, electrically connected to the other electrode of the MiM structure 328. HSPM 321 may represent either HSPM 121 or 122 of DDM 100. The MiM structure 328 is designed to provide the desired AC coupling between the TL signal electrode 331 and the HPSM 321. Substrate 399 supports the TL 331, the MiM 328 and the HSPM 321. There is a parasitic capacitive coupling $C_{TLtoSUB}$ and $C_{MIMtoSUB}$ between each of the TL 331, the MIM 328 and the substrate 399, which may negatively affect the device performance. This parasitic capacitive coupling may be somewhat reduced by disposing the MiM 328 directly beneath the signal electrode of TL 331, as illustrated in FIG. 7B, so that the MiM 328 at least partially shields the TL 331 from the substrate 399. Turning now to FIG. 7C, the TL-HSPM AC coupling may be simplified, and the parasitic coupling to the substrate 399 further somewhat reduced, by replacing a separate MiM structure 328 with a coupling electrode 361 that forms a MiM structure directly with the signal TL electrode 331.

Figure 7D:
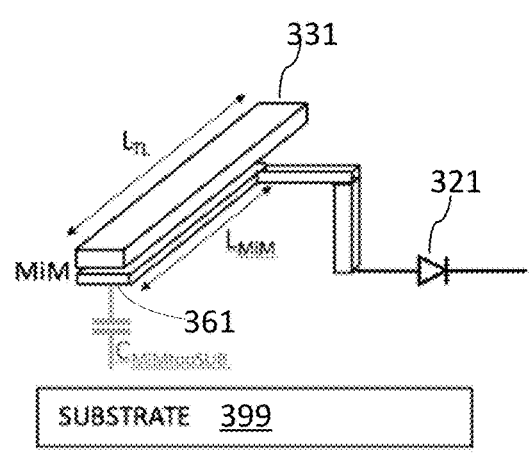
FIG. 7D is a schematic diagram illustrating a 3D view of a variation of the AC coupling structure of FIG. 7C with the HSPM connected to the coupling electrode at a distal end thereof in the direction of RF signal propagation.

Continuing to refer to FIGS. 7A-7D, the MiM 328 or the coupling electrode 361 may extend along at least a portion of a length of the TL 331, with the anode of the HSPM 121, or in another embodiment the cathode thereof, electrically connecting to a corresponding AC coupling electrode at any point along its length. Advantageously, they provide additional AC loading of the TL 331 that somewhat increases the device's impedance as seen by the DDM driver 135. This AC loading may have both a capacitive and an inductive components. In embodiments wherein the length $L_{MiM}$ of the corresponding MiM structure, for example the length of the coupling electrode 361, is comparable or exceeds the wavelength of the modulating RF signal propagating along TL 331, this AC loading may be further increased by connecting the HSPM 321 to the MiM, e.g. the coupling electrode 361, at a distal end thereof that is farther away from the input end of the TL 331, as illustrated in FIG. 7D. This increases the inductance of the MiM structure and thus the AC loading of the TLs, which serves to increase the device impedance, and thus may lessen the driver power requirements.

Figure 8A:
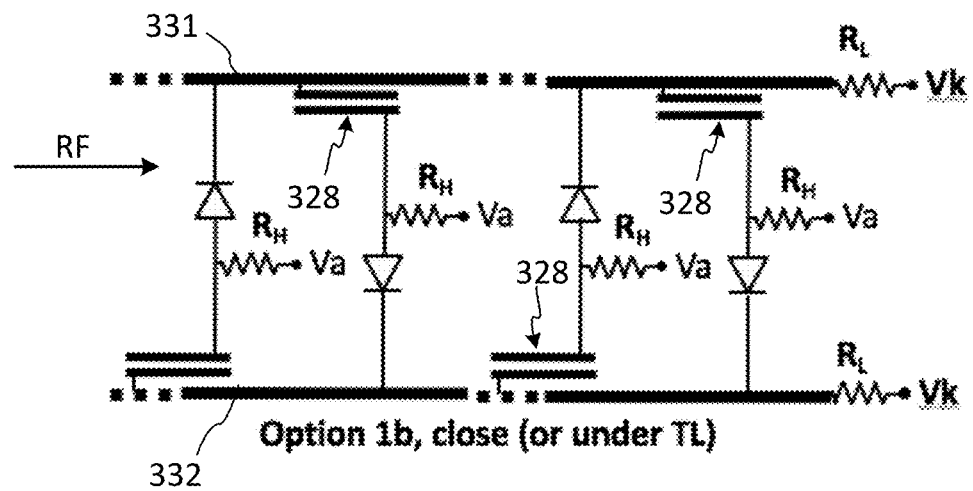
FIG. 8A is a simplified electrical circuit diagram of an embodiment of a DDM with the HSPNs connected to distal ends of MiM structures that provide the AC coupling between the TLs and the HSPMs.
Figure 8B:
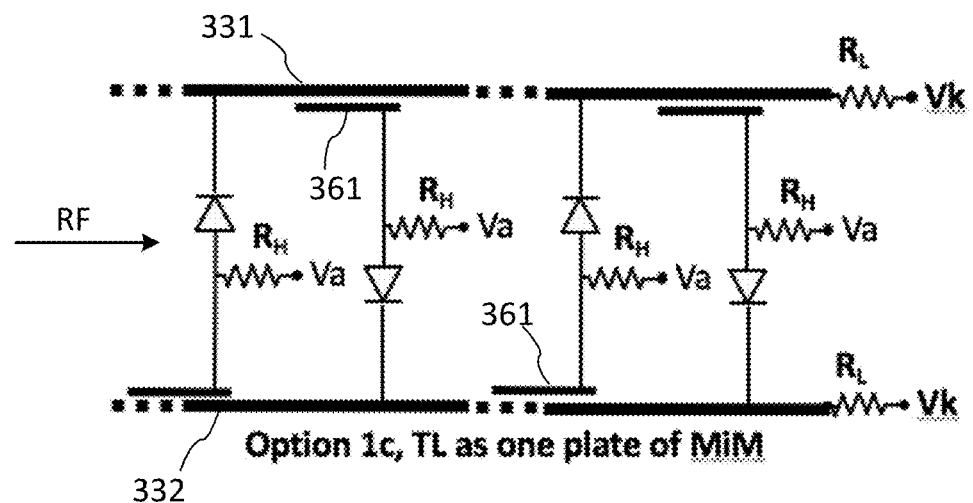
FIG. 8B is a simplified electrical circuit diagram of an embodiment of a DDM with the HSPNs connected to distal ends of coupling electrodes that provide the AC coupling between the TLs and the HSPMs.

FIGS. 8A and 8B schematically illustrate electrical circuitry of two example implementations of a DDM using MiM structures of the type illustrated in FIGS. 7A and 7C, respectively, configured for enhanced inductive contribution to the device impedance. In FIG. 8A the AC coupling between the HSPMs, illustrated with the diode symbols, and the TLs 331, 332 is provided by MiM structures 328, each of which extends along a length of a respective TL 331 or 332, with a distal end connected to an HSPM. In FIG. 8A the cathodes of HSPMs, or the anodes thereof in other embodiments, connect to distal ends of coupling electrodes 361 that are AC coupled to the respective TLs 331 or 332. In both figures the direction of the RF signal propagation is shown with an arrow labeled "RF". The term 'distal end' means the end of a MiM structure or an electrode that is farther away from the RF input end of the TLs.

In some embodiments the impedance of a DDM may be advantageously increased by configuring the single-ended TLs of a differentially-driven TL pair so as to increase their mutual inductance, for example shaping or routing them so that the TLs cross each other in one or more points thereby facilitating a magnetic coupling between the TLs.

Figure 9:
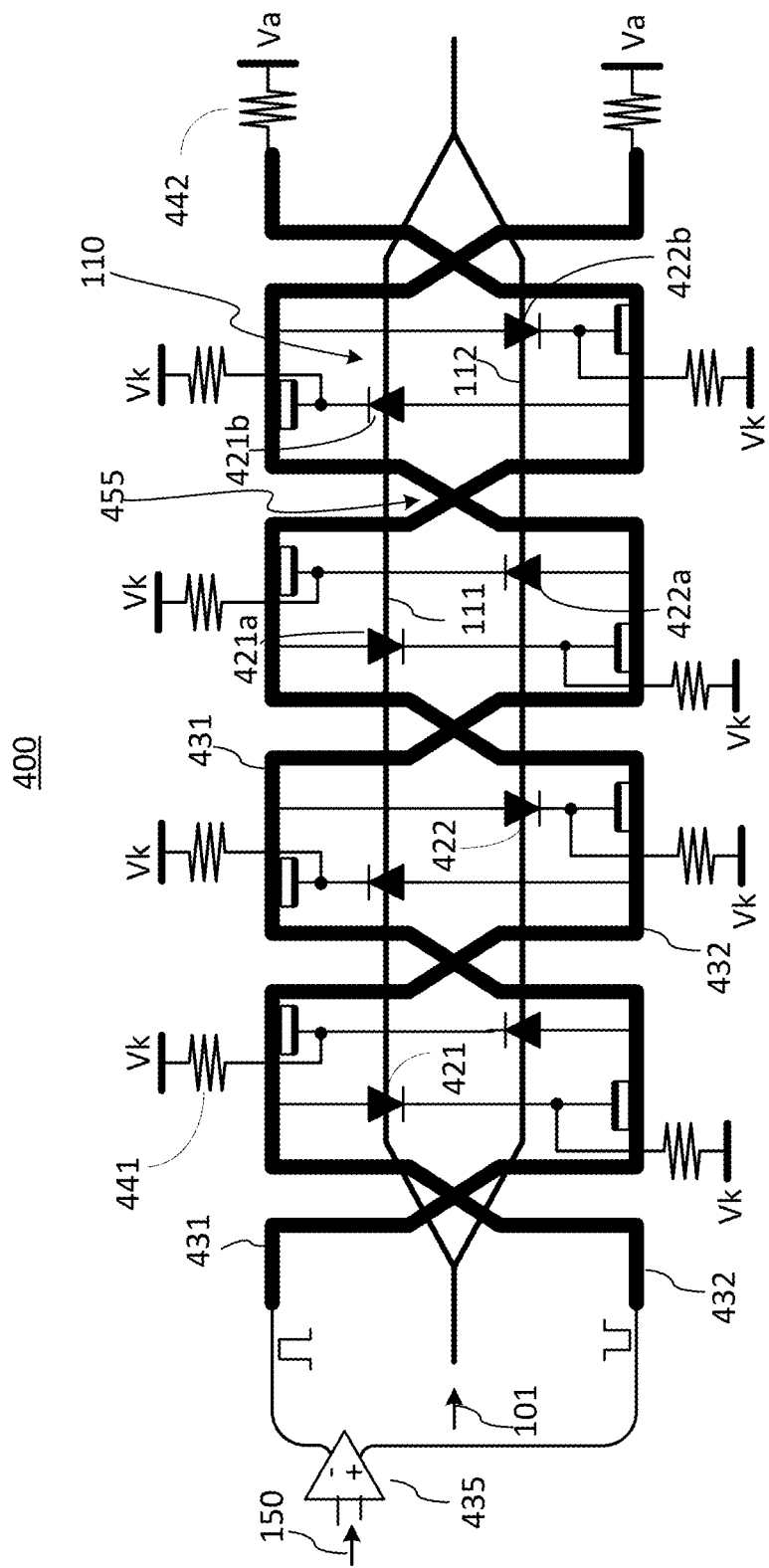
FIG. 9 is a schematic diagram of an embodiment of a DDM with two TLs crisscrossing for enhanced magnetic coupling therebetween.

Referring now to FIG. 9, an example DDM 400 is schematically illustrated in which two TLs 431, 432 meander so as to cross each other at a plurality of locations along the length of the DDM device 400. Similarly to the DDMs described hereinabove with reference to FIGS. 2, 5A-5C, the DDM 400 includes the MZI 110 with a set of first HSPMs 421 formed in its first waveguide arm 111 and a set of second HSPMs 422 formed in its second waveguide arm 112, where the number N of HSPMs in each waveguide arm 111 and 112 can vary from 2 to 20 or more depending on implementation, with N=4 illustrated in the figure by way of example. Each of the HSPMs 421, 422 is differentially driven by complementary RF signals propagating along two single-ended TLs 431, 432, and are coupled to the TLs 431 and 432 so that corresponding HSPMs 421 and 422 in the first and second waveguide arms 111, 112, respectively, are modulated in counter-phase. In the illustrated embodiment the anode of each HSPMs 421 or, 422 is DC coupled to one of the TLs 431 or 432 and is DC biased therefrom with a DC voltage Va that is applied to the TL 431 or 432 via a resistor 442, while its cathode is AC coupled to the other of the two TLs 431 or 432 and is DC biased with voltage Vk through a dedicated resistor 441. In other embodiments the polarities of the HSPMs 421, 422 may be reversed, or both the anodes and the cathodes may be AC coupled to the respective TLs 431 and 432. The TLs 431, 432 extend along the length of the DDM device 400 in a crisscross or meandering fashion, crossing each other at a plurality of locations along the device's length. The illustrated embodiment includes five TL crossings 455, but in other embodiments the number of TL crossings 455 may be different, generally one or greater. Mutual TL inductance at the TL crossings 455 due to the magnetic coupling between the TLs 431, 432 at the TL crossings 455 increases the device impedance seen by the differential driver 435, thereby enabling lower driver power for a same voltage swing Vpp. In order to facilitate push-pull modulation, two HSPMs 421 and 422 disposed in the same waveguide arm 111 or 112 at opposite sides of a TL crossing 455 may be of opposite polarity, so that for example the set of first HSPMs 421 includes two first HSPMs 421a, 421b of opposite polarity disposed at opposite sides of a TL crossing 455, and the set of second HSPMs 422 includes two second HSPMs 422a, 422b of opposite polarity disposed at opposite sides of the TL crossing 455.

Figure 10:
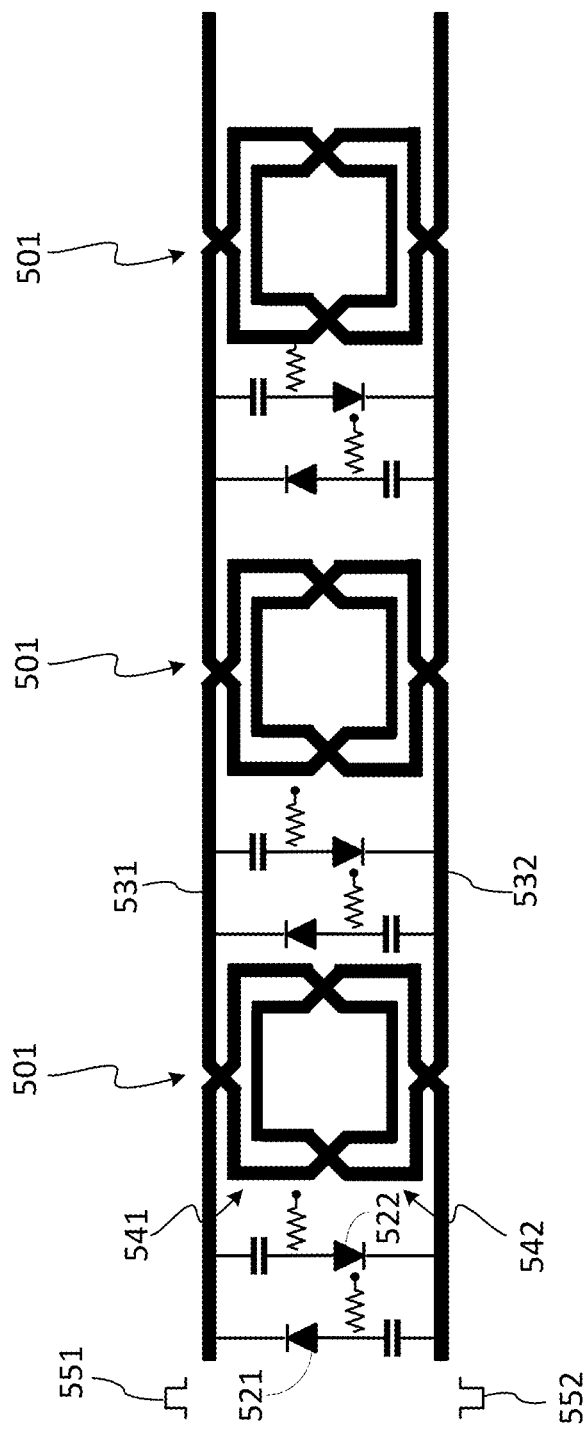
FIG. 10 is a schematic diagram of an embodiment of a DDM with two TLs routed to include overlapping loops for enhanced magnetic coupling therebetween.

It will be appreciated that FIG. 9 illustrates one of possible embodiments of a DDM 400 with TL crossings 455 that enhance their effective inductance, and other embodiments can be envisioned. FIG. 10 illustrates another example embodiment in which two TLs 531, 532, which drive two sets of HSPMs 521, 522 are routed to intersect at a plurality of device locations. In this example the TLs 531, 532 are routed to form overlapping TL loops or contours 541, 542, in which RF signals 551, 552 travel in opposite directions, thereby facilitating a strong magnetic coupling between the TLs at locations 501 of the loops 541 and 542. This strong magnetic coupling increases mutual inductance of the TLs 531 and 532, and thus increases the device's impedance as seen by a differential driver connected at one end of the TLs (not shown). Although FIG. 10 shows the overlapping TL loops at three locations 501 along the length of the device, with one pair of HSPMs 521, 522 therebetween, it will be appreciated that that is by way of example only, and in other embodiments the number of such locations 501 where the TL loop TLs 531 and 532 loop, and/or the number of HPSMs pairs 521 and 522 therebetween, may differ from what is shown in FIG. 10.

FIGS. 9 and 10 illustrate the use of TL crossings in DDMs in which two sets of HSPMs disposed in the two waveguide arms 111 and 112 of an MZI 110 are driven from a single TL pair. However a TL routing that facilitates magnetic coupling of two differentially driven TLs may be advantageously used in other types of differentially-driven travelling wave optical modulators, including but not limited to MZI-based modulators and ring modulators, among others.

With reference to FIG. 11, there is schematically illustrated a travelling-wave optical waveguide modulator according to an embodiment of the present disclosure. The modulator includes an optical waveguide 611 that may be connecting two optical ports 601, 602. A sequence of phase modulators (PMs) 621 is disposed along a length 1 of the optical waveguide 611, each having two electrodes that connect to a first TL 631 and a second TL 632. The TLs 631, 632 extend along the length 1 of waveguide 611 where the PMs 621 are located, and are routed to intersect each other in one or more locations, forming one or more TL crossings 655. The PMs 621 may be configured to modulate a phase of light propagating in the waveguide 611 in response to a difference in electrical signals propagating in the two TLs 631, 631. In one embodiment the PMs 621 may be in the form of p/n junctions with at least one of the anode electrode and the cathode electrode thereof. AC coupled to one of the TLs 631, 632, for example as described hereinabove. In another embodiment the PMs 621 may be based on a linear electro-optic effect (Pockels), such as that existing in lithium niobate ($LiNbO_3$) and similar electro-optic materials. Although schematically shown as straight, the waveguide 611 may be curved in some embodiments. The modulator illustrated in FIG. 11 may represent for example one waveguide arm, or a portion thereof, of a differentially-driven travelling-wave MZI modulator. In other embodiments it may represent another differentially-driven travelling-wave MZI modulator, or a portion thereof, for example a portion of a ring modulator. The TL crossing or crossings 655 facilitate magnetic coupling between the TLs 631, 632 for increasing an effective inductance and an impedance thereof. Although the TLs 631 and 632 in FIG. 11 meander to form a linear sequence of one or more TL crossings 655, two in the concrete example shown, in other embodiments more complex routing of the TLs 631 and 632 may be implemented, including but not limited to a TL routing wherein the two TLs form one or more overlapping loops along the length of the device, such as illustrated in FIG. 10.

FIGS. 12A and 12B illustrate example electrical biasing schemes of a DDM according to one or more embodiments of the present disclosure. In each of the FIGS. 12A and 12B, two sets of HSPMs 621 and 622, which may be sequentially disposed along two waveguide arms of an MZI for example as described hereinabove with reference to FIGS. 2, 5A-5C, are electrically coupled to a same pair of TLs 631, 632. The HSPMs 621, 622 may be each in the form of a p/n junction including an anode electrode and a cathode electrode, one of which is AC coupled to one of the TLs 631 or 632 and the other may be either AC or DC coupled. In the illustrated examples the cathodes of the HSPMs 621, 622 are AC coupled to the TLs 631, 632, respectively, while the anodes of the HSPMs 621, 622 are DC coupled to the TLs 632, 631, respectively. In each of the figures, the TLs 631, 632 are both DC coupled to a modulator driver 635. In the illustrated embodiments the modulator driver 635 includes at its output a differential amplifier formed by two transistors connected in an open collector, or open drain, configuration, with their emitters (sources) commonly connected to a current source that in operation generates a bias current $I_{bias}$. The collector or drain of each transistor is DC coupled to one of the two TLs 631, 632. Advantageously, with the driver 635 in an open collector configuration the electrical power dissipated by the driver 635 is reduced because there is no need for a termination impedance at the modulator input.

In a further advantage, the DC coupling of the open collector driver 635 to the TLs 631, 632 enables to bias the driver 635 and one the cathode or the anode electrodes of the HSPMs 621, 622 from a same bias voltage source or sources through bias resistors $R_L$. In the embodiment of FIG. 12A, the TLs 631, 632 are biased from a same source of bias voltage 611. In operation the bias voltage source 650 outputs bias voltage $V_{bias}=Vk+I_{bias} \cdot R_L/2$, where $I_{bias}$ is the current generated by the driver current source. This sets the HSPM cathode voltage Vk, which in the illustrated biasing scheme is also a bias voltage of the driver 634. In one embodiment Vk, and thus the bias voltage $V_{bias}$, may be selected to provide a desired operating point of the driver 635, with the anode voltage Va of the HSPMs 621, 622 then selected relative to Vk to provide a desired operation point of the of the HSPMs 621, 622.

FIG. 12B illustrates a Bias-T biasing scheme, in which a bias voltage Vk is provided to the TLs 631, 632 from voltage sources 651, 652 via high-impedance inductors 641 and 642, respectively. The inductance $L_T$ of each of the inductors 641, 642 may be selected high enough so that the impedance $Z_L=j2\pi \cdot f \cdot L_T$ of each inductor 641, 642 is much greater than $R_L$, for example by a factor of 10 or more, at any given frequency f within the operating bandwidth of the modulator, so as to avoid impacting the transmitter performance. This biasing scheme using a bias-T enables to set the cathode bias voltage and the driver bias voltage to a desired voltage Vk using lower-voltage sources 651, 652 of the bias voltage, thereby providing a further power saving of $(I_{bias})^2 \cdot R_L/4$.

With reference to FIG. 13, there is illustrated a portion of an example electrical layout of a travelling-wave MZI-based DDM that may be implemented in a silicon photonics chip. Optical waveguides 711, 712 that form the two arms of the MZI may be implemented in a silicon layer of the chip, with one or more p/n junctions formed in each of the waveguides 711 and 712 along their length. The waveguides 711 and 712 may have one or more waveguide loops 740 spread along the length of the device to provide velocity matching with the RF signals propagating along TLs 731 and 732. The TLs 731 and 732 are represented in the figure by their signal electrodes, with two ground planes 730 completing the TLs 731 and 732. Two sets of HSPMs 721, 722 are formed along the waveguides 711 and 712, with each HSPM 721 and 722 formed by providing anode and cathode electrodes in electrical contacts with the p-doped and n-doped regions of the p/n junction, respectively, at a target location along the waveguides 711 and 712.

Figure 14:
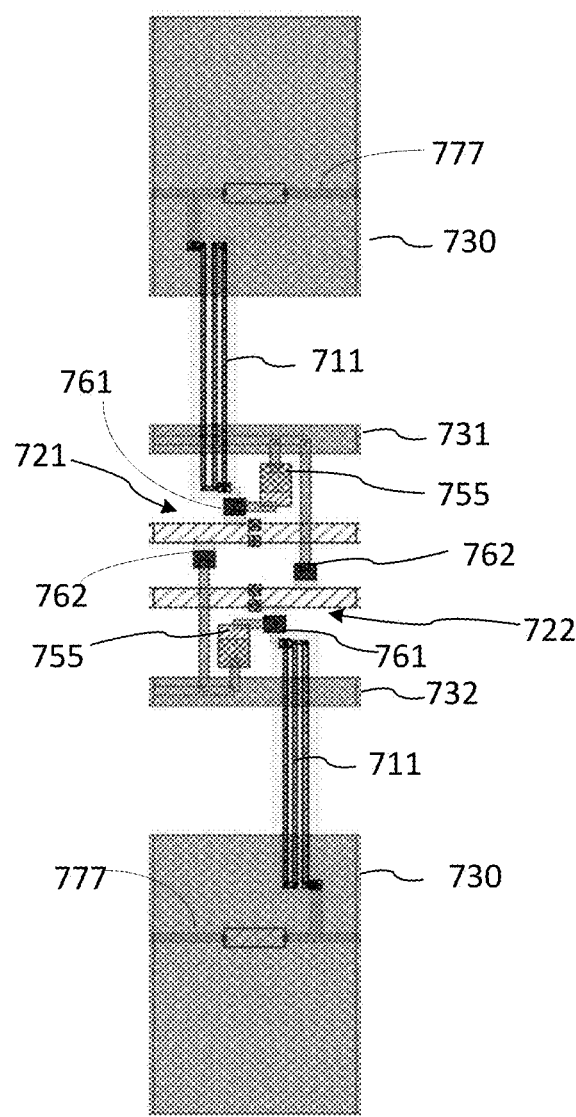
FIG. 14 is a zoomed-in view of the electrical layout of a modulating segment of the DDM chip of FIG. 13.

Referring now also to FIG. 14, the modulating portion of the DDM of FIG. 13 may be viewed as a sequence of modulator segments 750 having one HSPM 721 or 722 in each waveguide arm 711 or 712; FIG. 14 shows an expanded view of one such modulator segment. Each of the HSPMs 721, 722 formed by a cathode electrode 761 and an anode electrode 762 of a p/n junction in a respective waveguide arm 711 and 712, with the cathode electrodes 761 AC coupled to the respective TLs 731 or 732 with a MIM capacitor 755. Bias resistors 711 connect the cathodes 761 to respective bias metal traces 711, insulated from the ground electrodes 730, for connecting to a DC voltage supply. All elements illustrated in FIGS. 13, 14 may be formed in a same SOI chip with a compact form factor using CMOS technology.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that different electro-optic dielectric materials and semiconductor materials other than silicon, including but not limited to compound semiconductor materials of groups commonly referred to as A3B5 and A2B4, such as GaAs, InP, and their alloys and compounds, as well as such electrooptical materials as lithium niobate (LiNbO3) and the like, may be used to fabricate the optical modulator circuits example embodiments of which are described hereinabove. In addition, phase modulators other than p/n junctions can be used in semiconductor waveguides, including silicon waveguides, such as for example capacitive devices, silicon-insulator-silicon modulating structures, etc. In some embodiments wherein DC biasing of the HSPMs is not required, the HSPMs in each MZI arm may be DC coupled to the TLs. In other embodiments, HSPMs in each MZI arm may be AC coupled to each TL. In another example, although in the example embodiments described hereinabove the cathode and the anode electrodes of the HSPMs were DC biased using resistors, such as resistors RH in FIGS. 4A and 4B and resistors 221 or 222 in FIGS. 5A-5C, in other embodiments some or all of those resistors may be omitted and the DC bias voltage Va or Vk supplied using a bias-T. In another example, instead of using the same resistor for the TL termination 113 and to bias the HSPM electrodes that are DC coupled to the corresponding TL, such as for example illustrated in FIGS. 4A-5C, different resistors may be used for TL termination and DC biasing. In another example, although example embodiments described hereinabove may have been described primarily with reference to a waveguide modulator device including an MZI, it will be appreciated that principles and device configurations described hereinabove with reference to specific examples may be adopted to other types of optical waveguide modulators.

Furthermore, although some of the embodiment's described hereinabove use HSPMs in the form of depletion-mode p/n junctions formed in semiconductor waveguides, other embodiments may use forward-biased or non-biased p/n junctions, or use electro-optic properties of the waveguide arms material that do not require p/n junctions to modulate the refractive index in a portion of the waveguide arm, and hence to modulate the phase or amplitude of propagating light.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. A modulator comprising:
a first waveguide arm for guiding input light along a first path;
a second waveguide arm for guiding input light along a second path;
a first phase modulator (PM) along the first waveguide arm, the first PM comprising a first anode electrode and a first cathode electrode;
a second phase modulator (PM) along the second waveguide arm, the second PM comprising a second anode electrode and a second cathode electrode;
a first transmission line (TL) extending along, at least, a first segment of the first waveguide arm and a second segment of the second waveguide arm and being electrically coupled to the first anode electrode and to the second cathode electrode; and
a second transmission line (TL) extending along, at least, a third segment of the first waveguide arm and a fourth segment of the second waveguide arm and being electrically coupled to the first cathode electrode and to the second anode electrode; and
a driver configured to feed electrical drive signals into the first and second transmission lines;
wherein the first transmission line and the second transmission lines cross each other at least once.

2. The modulator according to claim 1, wherein the first waveguide arm and the second waveguide arm include electro-optic material; wherein the first PM comprises a p/n junction in the first waveguide; and wherein the second PM comprises a p/n junction in the second waveguide.

3. The modulator according to claim 1, wherein the first waveguide arm and the second waveguide arm include electro-optic material; wherein the first PM comprises a plurality of first p/n junctions in the first waveguide; and wherein the second PM comprises a plurality of second p/n junctions in the second waveguide.

4. The modulator according to claim 1, further comprising electrical circuitry for providing a DC bias voltage to at least one of the first cathode electrode, the second cathode electrode, the first anode electrode, and the second anode electrodes.

5. The modulator according to claim 4, wherein the first cathode electrode is AC-coupled to the second transmission line; and wherein the second cathode electrode is AC-coupled to the first transmission line.

6. The modulator according to claim 5, wherein the electrical circuitry includes a first resistor electrically connected to the first cathode electrode for DC biasing thereof, and a second resistor electrically connected to the second cathode electrode for DC biasing thereof.

7. The modulator according to claim 4, wherein the first anode electrode is AC-coupled to the second transmission line; and wherein the second anode electrode is AC-coupled to the first transmission line.

8. The modulator according to claim 7, wherein the electrical circuitry includes a first resistor electrically connected to the first anode electrode for DC biasing thereof, and a second resistor electrically connected to the second anode electrode for DC biasing thereof.

9. The modulator according to claim 4, wherein the electrical circuitry includes a first coupling electrode electrically connected to the first cathode electrode, and capacitively coupled to the second transmission line; and a second coupling electrode electrically connected to the second cathode electrode, and capacitively coupled to the first transmission line.

10. The modulator according to claim 9, wherein the first coupling electrode is disposed over or under the second transmission line with an insulating layer therebetween.

11. The modulator according to claim 10, wherein the first TL includes an input end for receiving the electrical drive signals, wherein the second coupling electrode extends along the first TL for at least a portion of a length thereof, and wherein the first cathode electrode is electrically connected to the first coupling electrode at a distal end thereof farther away from the input end of the first TL.

12. The modulator according to claim 9, wherein the first coupling electrode comprises a MiM structure disposed next to the second transmission line.

13. The modulator according to claim 4, wherein the electrical circuitry includes a first coupling electrode electrically connected to the first anode electrode, and capacitively coupled to the second transmission line; and a second coupling electrode electrically connected to the second anode electrode, and capacitively coupled to the first transmission line.

14. The modulator according to claim 13, wherein the first coupling electrode is disposed over or under the second transmission line with an insulating layer therebetween.

15. The modulator according to claim 14, wherein the first TL includes an input end for receiving the electrical drive signals, wherein the second coupling electrode extends along the first TL for at least a portion of a length thereof, and wherein the first anode electrode is electrically connected to the first coupling electrode at a distal end thereof farther away from the input end of the first TL.

16. The modulator according to claim 13, wherein the first coupling electrode comprises a MiM structure disposed next to the second transmission line.

17. The modulator according to claim 3, wherein the plurality of first p/n junctions comprises two first p/n junctions of opposite polarity disposed on opposite sides of the TL crossing, and
wherein the plurality of second p/n junctions comprises two second p/n junctions of opposite polarity disposed on the opposite sides of the TL crossing.

18. The modulator according to claim 17, wherein the first transmission line forms a first loop, and the second transmission line forms a second loop; and wherein the first loop overlaps the second loop forming a plurality of TL crossings.

19. The modulator according to claim 17, further comprising electrical circuitry for providing a DC bias voltage to at least one of the first cathode electrode, the second cathode electrode, the first anode electrode, and the second anode electrodes; wherein the electrical circuitry includes a first coupling electrode electrically connected to the first cathode electrode of each of the plurality of first p/n junctions, and capacitively coupled to the second transmission line; and a second coupling electrode electrically connected to the second cathode electrode of each of the plurality of second p/n junctions, and capacitively coupled to the first transmission line.

* * * * *